March 2, 1971 R. A. BENEDICT, JR 3,566,616
ORNAMENTAL FINGER RING HAVING A SEPARABLE CONNECTION IN ITS BAND
Filed Feb. 14, 1969 2 Sheets-Sheet 1
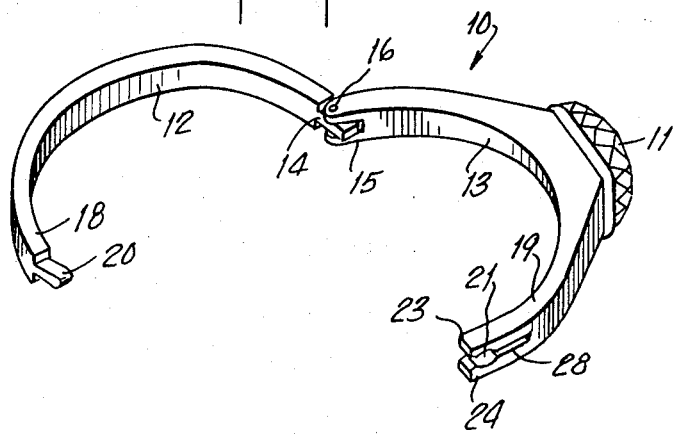
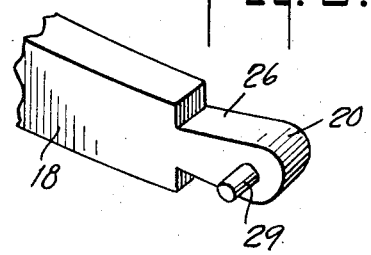
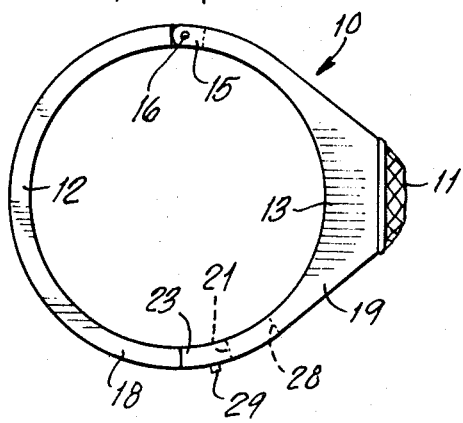
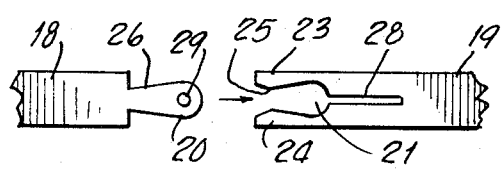
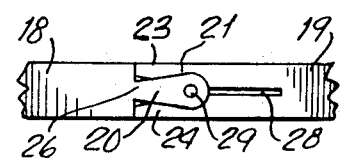
INVENTOR.
ROBERT A. BENEDICT, JR.
BY
Robert S. Dunham
ATTORNEY

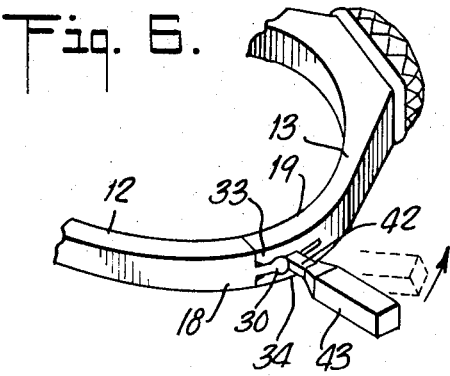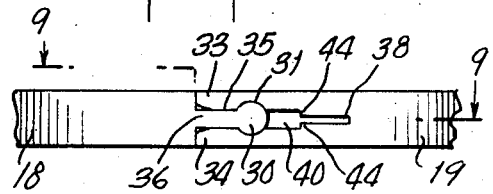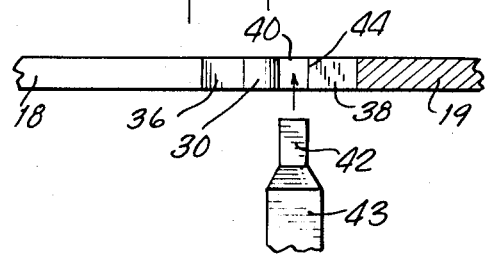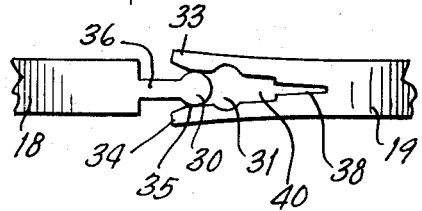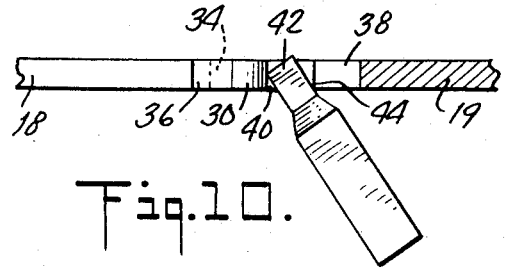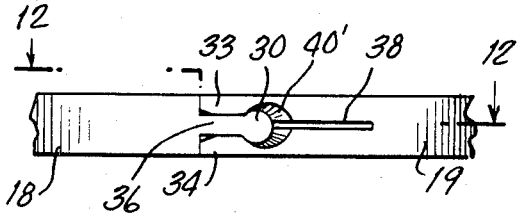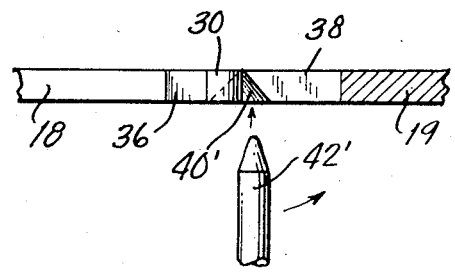

United States Patent Office 3,566,616
Patented Mar. 2, 1971

3,566,616
ORNAMENTAL FINGER RING HAVING A
SEPARABLE CONNECTION IN ITS BAND
Robert A. Benedict, Jr., Norwalk, Conn.
(R.F.D. 4, Waldoboro, Maine 04572)
Continuation-in-part of application Ser. No. 525,973,
Feb. 8, 1966. This application Feb. 14, 1969, Ser.
No. 799,482
Int. Cl. A44c 9/00
U.S. Cl. 63—15.7                              3 Claims

ABSTRACT OF THE DISCLOSURE

A finger ring which can be opened to facilitate placement upon and removal from a finger is constituted by hinged arcuate parts respectively carrying a plug and socket, the latter being shaped to grip the head and reduced neck of the plug and being slotted into the arcuate part for resiliently holding the plug. The cavity is most advantageously open at inside and outside faces of the ring and the plug is shaped to extend laterally to said faces, filling them when inserted in the cavity. Effective special provision is made for ready opening of the ring by manipulation, with a simple insertable element.

CROSS-REFERENCE TO RELATED APPLICATION

This application is a continuation-in-part of my copending application Ser. No. 525,973, filed Feb. 8, 1966, for Finger Ring, now abandoned.

BACKGROUND OF THE INVENTION

This invention relates to finger rings, as worn for ornamental and like purposes, and is particularly concerned with a ring of separable design, i.e., wherein the band can be opened to facilitate placing the ring on, and removing it from, the finger. A ring of this construction obviates any problems of moving a ring down over the knuckles, and permits the ring, in its closed condition, to be made with a better fit, i.e., to a size which avoids looseness (that is otherwise required, in nonopening rings, in order to put them on) and which thereby keeps the ring more satisfactorily in place, against movement in any direction, and with the setting or other ornamental portion in proper position at the outer side of the finger at all times.

While rings with separable or adjustable bands have been heretofore proposed or made, such previous devices have not appeared to be wholly satisfactory for one or more reasons such as mechanical complexity of the structure, or unsightliness, or high cost of manufacture, or difficulty in the manipulation required to open and close the band, or possible hazard of injury to the user.

SUMMARY OF THE INVENTION

Important objects of the present invention are therefore to overcome these difficulties and to provide a new and improved ring of the character stated, which is of relatively simple construction, and yet is of suitable strength and is securely locked or latched in closed condition, a further object being to provide a band of which a section can be very easily opened, and as easily closed, and in which the structure appurtenant to these functions is practically unnoticeable when the band is closed. Special advantages of the ring of the invention are that its mechanical features can be applied to any of a wide variety of types, shapes and sizes of rings, and can be embodied with no supplemental or moving parts for the latch. Indeed the device requires no projecting or overlapping clips, straps, sleeves or the like along the ring band, which may be difficult to use and may even cause minor injury to the wearer; nor does manipulation of the improved ring structure require pinching or undesirable pressure against the finger.

Briefly and with reference to a presently preferred embodiment, the invention comprises a finger ring band hinged to open as two arcuate parts, with a plug at the end of one part arranged to be received in a socket at the end of the other part, such socket having a pair of jaws defining an opening that extends from side to side of the band and that is filled by the plug from side to side, and the jaws being arranged to grip the plug resiliently by virtue of a slot that extends along the band from the jaw opening. Most advantageously a further recess is provided, e.g., adjacent to or as part of the slot, shaped to receive a simple implement whereby the jaws can be readily forced apart to release the plug and effect desired opening of the ring.

To the above-mentioned and other ends, the novel elements and combinations of the invention are more fully disclosed in the following description of certain presently preferred embodiments, set forth by way of example, and shown in the drawings.

BRIEF DESCRIPTION OF THE DRAWING

FIG. 1 is an enlarged perspective view of a ring embodying the invention;

FIG. 2 is a fragmentary, further enlarged view of one of the latch parts of the ring;

FIG. 3 is a plan view of the ring in closed position;

FIGS. 4 and 5 are fragmentary side views of the latch parts, respectively in open and closed relations;

FIG. 6 is a fragmentary enlarged view of a ring, similar to FIG. 1, showing a modified embodiment of the invention;

FIG. 7 is a fragmentary, further enlarged, side view of the latch parts of the ring of FIG. 6, moving into closed position;

FIG. 8 is a view like FIG. 7, with parts closed;

FIG. 9 is a part plan, part section on line 9—9 of FIG. 8;

FIG. 10 is a view like FIG. 9, showing the latch parts being moved open; and

FIGS. 11 and 12 are views respectively like FIGS. 8 and 9, showing another modification.

DETAILED DESCRIPTION

As illustrated in FIGS. 1 to 5, the ring comprises a band 10 of conventional shape, providing an annulus to surround a finger and having an appropriate setting, stone or other ornamentation as indicated at 11. The band is formed of a plurality of endwise abutting or arranged arcuate parts, particularly two such parts 12 and 13, the part 13 including the ornamental setting 11 and projecting substantially equally from the latter.

The parts 12, 13 are hinged together at one end of each, as by the tongue 14 which projects from the part 12, and which is overlapped by the bifurcated structure 15 at the end of the part 13. These elements 14 and 15 being secured by a hinge pin 16, the arcuate part 12 can be swung outwardly from the part 13, as to the open position of FIG. 1 for applying the ring around a finger. As shown, the hinge 14–15 is advantageously constructed so that its parts lie within the enveloping cross-sectional boundary of the ring band 10, there being nothing projecting from the band when the parts are closed as in FIG. 3.

In special accordance with the invention, the end portions 18, 19 of the arcuate parts 12, 13, being the ends opposite the hinge 14–15, carry elements providing a latch for releasably holding the parts in closed position. In the preferred construction shown, the latch parts, which are formed entirely integral with the bodies of the arcuate band parts 12, 13, consist of a projecting element of the nature of a plug 20 and a receiving cavity or opening of the nature of a socket 21. While either latch element may be associated with either band part, the illustrated structure advantageously includes the socket structure 21 in the band part 13. In the presently preferred construction of FIGS. 1 to 5, the socket 21 is in the nature of a transverse opening, extending through the band from inside the outside and opening endwise of the end portion 19 of the arcuate part 13, i.e., as constituted by a pair of jaws 23, 24. The endwise projecting plug or tongue element 20 is arranged to enter the socket 21 as the ring parts are closed, i.e., between the jaws 23, 24.

It will be noted that the socket cavity 21, i.e., the inner face structure of the jaws 23, 24, is shaped to provide a reduced neck opening 25 relative to the further part of the cavity, such that there is resistance to the entrance of the head of the plug 20 when the latter is pushed against the cavity, the neck opening being normally smaller, in a direction parallel to the axis of the annulus, than the width of the plug head. The latch or fastening means includes resilient structure permitting the plug head to be inserted, i.e., by temporary deformation of at least one of the parts in response to pressure of such insertion, whereby the plug seats in the cavity and the jaw portions 23, 24 of the socket engage a correspondingly reduced neck region 26 of the plug. Although such resilient means can comprise a horizontally slotted structure of the plug (as permitting upper and lower parts of it to be squeezed together) or can include resilient arrangement in each latching element, the illustrated device comprises, with special advantage, a horizontally slotted configuration of the end portion 19, including a slot 28 opening into the socket cavity 21 and extending rearwardly for at least a like and sometimes greater distance along the body of the arcuate part 13. Thus the socket essentially involves an opening across the band (from inside to outside) and extending, in the manner of a slot as at 28, rearwardly of the end portion 19 from its end, whereby the upper and lower jaw-like parts 23 and 24 may be stiffly sprung apart a small distance, sufficient to admit the head of the plug 20.

In this fashion as the band part 12 is brought to closed relation, through the position of FIG. 4, the plug is snapped into place in the socket (FIG. 5), where it is thereafter securely held by the resilient grip of the socket jaws 23, 24. The parts may be opened, however, by pulling them away from each other, i.e., at the end portions 18, 19, so that the head of the plug is forced past the jaws, springing them slightly apart. For preferred grip in closed position, the jaws 23, 24 should be biased closer together at neck 25 than the width of the plug neck 26.

Advantageously, both elements of the latch structure are formed integral with the associated band parts, and are designed so that they have no substantial mechanical or supplemental arrangements projecting outside the enveloping cross-sectional boundary of the band. Thus when closed (FIGS. 3 and 5), the band is essentially smooth and continuous at both its hinge connection and its latch connection, for corresponding good appearance and full comfort to the wearer.

If desired, the plug 20 may carry a small projecting stud or pin 29, at the outer side, to facilitate manual movement of the end portion 18 away from the portion 19, to open the ring. The complete structure is entirely simple and effective, having all of the advantages described hereinabove and permitting easy application of a suitably close fitting ring to the finger of the wearer. The opening and closing operations are easily performed and in the closed position, the parts are quite securely held, but subject to ready release when desired.

A significant feature of the invention in its preferred, specific aspects, is that the ring band is composed of only two arcuate parts, each of which is approximately semi-circular, such that in the last stage of the closing operation, the plug 20 approaches the socket 21, along a path which is close to a straight line, thus facilitating the latch-closing function and attainment of the desired smooth alignment of the latched parts. In a broader sense, it is presently conceived that each of the arcuate parts should constitute at least about one-third of the circumference of the annulus, i.e., to achieve good endwise engagement of the plug and socket.

A modification of the device, including a further feature of advantage, is shown in FIGS. 6 to 10, being embodied in a ring structure having like arcuate parts 12, 13 terminating in like end portions 18, 19 that respectively embody a plug 30 and a socket 31. The jaws 33, 34 of the socket are arranged to provide a reduced neck opening 35 for resiliently engaging the reduced neck 36 of the cylindrically-headed plug 30, in essentially the same way as the parts of FIGS. 1 to 5. The neck 36 and neck opening 35 of the device of FIGS. 7 and 8 are shown with parallel sides, as an effective alternative to the shape of FIGS. 4 and 5, but either shape can be used in either device. The socket cavity 31 communicates with a slot 38, opening (like the socket) across the band, to permit resilient spread of the jaws 33, 34 for entry of the plug 30 as shown in FIG. 7.

The end portion 19 also includes a recess 40, conveniently rectangular, which forms part of the jaw opening (across the band) between the plug-receiving space and the slot 38 (in effect part of the slot) and which is wider than the slot but is preferably narrower than the head of the plug 30. In particular, the recess 40 is so shaped that when the latch parts are closed, a simple pin-like tool 42 (preferably having a cross-section corresponding to that of the recess) may be inserted, and may be rocked, counterclockwise as seen in FIGS. 6, 9 and 10, to pry or force the plug 30 out of the socket 31. In such action the tool 42 (manually held by its thicker shank 43) receives a purchase against the shoulders 44 constituted by the wall of recess 40 adjacent to the slot 38, so that there is effective leverage applied to a leading part 45 of the tool, for pushing the plug endwise and outward, i.e., by forcing the jaws 33, 34 to open (deforming them against their resilience) in the same manner as on receiving the plug (FIG. 7).

Thus the ring is very easily opened with manipulation of the simple tool 42, which may be designated a key, and which may be displaced to free the plug with the aid of mechanical advantage, so that there is no need for directly pulling on the latched ring parts or for providing an engageable stud 29 or the like at the side. Indeed not only is it easier to separate the parts, but they can be designed for tighter fit and for stiffer resilience of the jaws 33, 34—with correspondingly better security and rigidity in the latched position—while being readily opened when desired. The key 42 is of simple shape, preferably designed to conform with the shape of the recess 40, although any like pin-like article can be used if necessary, even a small brad or nail, for the same purpose.

FIGS. 11 and 12 show an alternative form of the key-opened device described above, wherein the recess 40', corresponding to the recess 40, is shaped by eccentrically countersinking the plug head space from the outer face of the band part 19, whereby a tapered-end tool or key 42' can be inserted behind the plug head and rocked to separate the parts in essentially the same way.

As will be apparent, the structure is applicable to a wide variety of ornamental finger rings, including various band configurations, e.g., whether oval or substantially rectangular in cross-section as taken by way of example in the drawings. In all cases the invention provides a finger ring which can be very easily opened for application and removal, yet which is securely held in the latched position and which is such that the mechanical features are practically unnoticeable when the ring is worn. As stated, the desired results are effectively achieved, in providing a separable finger ring.

It is to be understood that the invention is not limited to the specific structures herein shown and described but may be embodied in other forms without departure from its spirit.

I claim:

1. An ornamental finger ring comprising a band shaped to provide an annulus for surrounding a finger and consisting of a plurality of endwise abutting arcuate parts, hinge means connecting one end of a first of said parts to the adjacent end of another of said parts, and arranged for the first part to swing outwardly of the annulus for moving the portion at the second end of said first part away from a third end portion, of one of said arcuate parts, to open the band, and separable fastening means constituted in said second and third end portions for joining them when the first part is swung inwardly to close the band, said fastening means including plug means extending endwise from one of said second and third end portions and socket means at the other said end portions with a cavity opening endwise of its said end portion for receiving and holding the plug means, said plug and socket means respectively having a head portion and a cavity neck portion which have a mutual configuration for resisting insertion of the plug means into the socket means, and said fastening means comprising resilient structure deformable by entering pressure of the plug means on the socket means to alter said mutual configuration for permitting such insertion, said plug means comprising a plug having a head and a neck of reduced size relative to the head, said socket means cavity being shaped to fit the plug and said cavity neck portion being of reduced size corresponding to the plug neck, said resilient structure being embodied in a slotted configuration of the socket means, said socket means having the aforesaid cavity open essentially fully at the radially inside and outside faces of the ring, and the associated arcuate part of said socket means including a slot extending from the cavity rearwardly in the arcuate part, said plug means extending laterally from said inside to outside faces of the ring so that the area of said faces, at the region of the cavity, is substantially filled by the plug when inserted in the cavity, further structure of said finger ring being that the arcuate part having the socket means includes a recess constituting an enlargement in said slot adjacent to said cavity and having a wall spaced from the inserted plug, said recess being shaped to receive an inserted tool which can be moved against said wall and against the head of the plug inserted in said cavity, with mechanical advantage, to free the plug from said resilient structure.

2. An ornamental finger ring comprising a band shaped to provide an annulus for surrounding a finger and consisting of a plurality of endwise abutting arcuate parts, hinge means connecting one end of a first of said parts to the adjacent end of another of said parts, and arranged for the first part to swing outwardly of the annulus for moving the portion at the second end of said first part away from a third end portion, of one of said arcuate parts, to open the band, and separable fastening means constituted in said second and third end portions for joining them when the first part is swung inwardly to close the band, said fastening means including plug means extending endwise from one of said second and third end portions and socket means at the other of said end portions with a cavity opening endwise of its said end portion for receiving and holding the plug means, said plug and socket means respectively having a head portion and a cavity neck portion which have a mutual configuration for resisting insertion of the plug means into the socket means, and said fastening means comprising resilient structure deformable by entering pressure of the plug means on the socket means to alter said mutual configuraton for permitting such insertion, said band consisting of two endwise abutting arcuate parts each constituting at least about one-third of the annulus, said hinge means constituting interfitting mutually hinged portions of the first end of the first of the parts, and the adjacent end of the other part, said plug means comprising a plug which has a head and a neck of reduced size relative to the head and which has substantially flat inside and outside faces corresponding to radially inside and outside faces of the ring, said cavity neck portion being of reduced size corresponding to the plug neck, said socket means having a laterally open configuration that divides the cavity neck structure into two elements and that includes a rearwardly extending slot in the arcuate part that carries the socket means, for resilient outward deformation of said elements to permit insertion of the plug head into the cavity, and said cavity being essentially fully open at the outside face to the ring and said plug being shaped and arranged so that when it is inserted in the cavity its outside face is exposed at and is flush with the outside face of the ring, further structure of said finger ring being that the arcuate part that has the socket means includes a recess which constitutes an enlargement in said slot and which is open at said outside face of the ring adjacent to said cavity, said recess being shaped to receive an inserted tool manipulable to exert prying force for freeing the plug from said elements.

3. A finger ring comprising a band shape to provide an annulus for surrounding a finger and consisting of a plurality of endwise abutting arcuate parts, hinge means connecting one end of a first of said parts to the adjacent end of another of said parts, and arranged for the first part to swing outwardly of the annulus for moving the portion at the second end of said first part away from a third end portion, of one of said arcuate parts, to open the band, and separable fastening means constituted in said second and third end portions for joining them when the first part is swung inwardly to close the band, said fastening means including plug means extending endwise from one of said second and third end portions and socket means at the other of said end portions with a cavity opening endwise of its said end portion for receiving and holding the plug means, said plug and socket means respectively having a head portion and a cavity neck portion which have a mutual configuration for resisting insertion of the plug means into the socket means, said fastening means comprising resilient structure deformable by entering pressure of the plug means on the socket means to alter said mutual configuration for permitting such insertion, said socket means comprising a pair of jaws arranged to grip the plug resiliently and separated by said cavity extending from the radially inside face to the radially outside face of the band part which carries said socket means, and said socket means having a recess open to said cavity and also open through the outer face of the band part which carries said socket means, said recess being shaped to receive an inserted tool in abutment with the end of the plug means and in abutment with an inner face of the recess, said inner face of the recess being disposed opposite the plug means, so that the tool can be displaced to force the plug means outwardly of the socket means.

References Cited

UNITED STATES PATENTS

| | | | |
|---|---|---|---|
| 294,277 | 2/1884 | Schindler | 63—15.65X |
| 1,409,138 | 3/1922 | Fontana. | |
| 2,493,285 | 1/1950 | Granat. | |
| 2,771,753 | 11/1956 | Sallan. | |
| 2,971,354 | 2/1961 | Beizer | 63—15.5 |
| 3,127,757 | 4/1964 | Weiss. | |
| 3,263,444 | 8/1966 | DiCroce. | |

FOREIGN PATENTS

| | | | |
|---|---|---|---|
| 1,074,921 | 2/1960 | Germany | 24—241(S) |
| 584,404 | 1/1947 | Great Britain. | |

F. BARRY SHAY, Primary Examiner

U.S. Cl. X.R.

24—230, 249